(12) United States Patent
Allpress et al.

(10) Patent No.: US 7,424,071 B2
(45) Date of Patent: Sep. 9, 2008

(54) DECODER AND A METHOD FOR DETERMINING A DECODING RELIABILITY INDICATOR

(75) Inventors: Stephen Alan Allpress, Bristol (GB); Carlo Luschi, Oxford (GB)

(73) Assignee: ICERA Inc., Bristol (GB)

( * ) Notice: Subject to any disclaimer, the term of this patent is extended or adjusted under 35 U.S.C. 154(b) by 590 days.

(21) Appl. No.: 11/168,642

(22) Filed: Jun. 27, 2005

(65) Prior Publication Data
US 2006/0291593 A1 Dec. 28, 2006

(51) Int. Cl.
*H04L 27/06* (2006.01)
(52) U.S. Cl. .................................... 375/343
(58) Field of Classification Search ........... 375/262, 375/265, 341, 343; 714/780, 792, 794–795
See application file for complete search history.

(56) References Cited

U.S. PATENT DOCUMENTS

| | | | | |
|---|---|---|---|---|
| 5,673,291 A | * | 9/1997 | Dent | 375/262 |
| 6,515,980 B1 | * | 2/2003 | Bottomley | 370/342 |
| 6,999,533 B2 | * | 2/2006 | Murthy et al. | 375/343 |
| 7,103,085 B1 | * | 9/2006 | Dabak et al. | 375/132 |
| 2004/0057468 A1 | * | 3/2004 | Shieh et al. | 370/514 |
| 2005/0002477 A1 | * | 1/2005 | Kajita et al. | 375/341 |
| 2006/0140313 A1 | * | 6/2006 | Futami et al. | 375/343 |

* cited by examiner

*Primary Examiner*—Khanh C Tran
(74) *Attorney, Agent, or Firm*—Smith-Hill and Bedell

(57) ABSTRACT

A decoder for use in a wireless communication device, the decoder comprising a correlator for correlating a received data sequence with a set of codewords such that a correlation value is generated for each correlation, wherein the set of codewords correspond to possible codewords that could be generated from encoding bit sequences having a predetermined number of information bits; a selector for selecting a first correlation value and a second correlation value generated by the correlator and for subtracting the second correlation value from the first correlation value to generate a third value; and a comparator for comparing the third value with a predetermined value to generate a decoding reliability indicator.

16 Claims, 2 Drawing Sheets

DECODER AND A METHOD FOR DETERMINING A DECODING RELIABILITY INDICATOR

FIELD OF THE INVENTION

The present invention relates to a decoder and a method for decoding, and in particular a decoder for use in a wireless communication system.

BACKGROUND OF THE INVENTION

An air interface is used in a wireless communication system to define the exchange of information between user equipment UE, for example a radiotelephone, and a base station or other communication system element.

For example, the High Speed Downlink Packet Access HSDPA specification, which forms part of the third generation partnership project 3GPP universal mobile telecommunication system UTMS specification, defines a High Speed Downlink Shared Channel HS-DSCH for allowing data transmissions from a base station to a plurality of UEs by sharing a given number of HS-DSCH codes among the plurality of UEs in a time/code division manner. To facilitate the sharing of the HS-DSCH channel among a plurality of UEs in a time/code division manner, an associated High Speed Shared Control Channel HS-SCCH provides information that allows a UE to make a determination as to whether data being transmitted in the HS-DSCH is intended for the UE.

As such, HS-SCCHs are used for transmitting signalling information to allow a UE to determine which data transmissions are intended for the UE and to allow the processing of data transmitted on the HS-DSCH by the appropriate UE.

The signalling information (i.e. control channel data) that is incorporated in an HS-SCCH is transmitted in time transmission intervals TTIs, where a TTI is divided into two parts. The first part of a TTI uses a UE specific masking, which allows a UE to make a determination as to whether data transmitted on an associated HS-DSCH is intended for that particular UE. The second part of the TTI includes a UE specific Cyclic Redundancy Check CRC attachment, which makes it possible to assess the result of HS-SCCH detection performed from the first part of the TTI.

The TTIs of the HS-SCCH are built on a three time slot per frame structure corresponding to a time interval of 2 ms. The first part (i.e. Part 1) of the HS-SCCH control channel is transmitted in the first time slot of the TTI and includes information of the HS-DSCH channalization code set (corresponding to 7 bits) and modulation scheme (corresponding to 1 bit). The second part (i.e. Part 2) of the HS-SCCH control channel is transmitted in the second and third time slots of the TTI and contains information on the HS-DSCH transport block size (corresponding to 6 bits) and Hybrid Automatic-Repeat Request HARQ process (corresponding to 7 bits). For robustness and to aid data recovery the data associated with part 1 and part 2 of the HS-SCCH TTI is encoded, using a convolutional code of rate R=1/3 and constraint length K=9.

For the purposes of the 3GPP UTMS standard the coding scheme applied to the signalling information transmitted in Part 1 of the HS-SCCH produces 48 bits from the 8 Part 1 information bits. These encoded bits are then rate matched (i.e. punctured) to produce 40 bits, which are masked by a UE specific mask, thereby generating a 40-bit transmitted codeword as is well known to a person skilled in the art.

This process is illustrated in FIG. 1, which shows a transmitting element 10 for use in a wireless communication system element 11, for example a base station, which is arranged to encode a data string. The transmitting element includes a first element 12 that is arranged to receive the 7 channelization code bits 13 and the modulation code bit 14 to which is appended 8 tail bits. The information bits and appended tail bits are then provided to a convolutional encoder 15, which generates a 48 bit codeword that is fed to a rate matching element 16. The rate matching element 16 punctures the received codeword to produce a 40 bit sequence, which is passed to a masking element 17 that masks the rate punctured codeword with a UE specific scrambling sequence. The resulting codeword is then passed to a transmitter 18 for modulation, spreading and generation of a WCDMA transmitted signal.

To allow a UE to make a determination as to whether there is data being transmitted in one or more of the HS-DSCH codes that is intended for the UE, part 1 of the HS-SCCH (i.e. the first time slot of the HS-SCCH TTI) is transmitted in advance of the HS-DSCH data transmission. As such, a UE must decode the first part of the TTI in each HS-SCCH, where typically in a 3GPP UTMS system there are up to four HS-SCCHs transmitted simultaneously, in order to determine whether or not a data transmission included in a HS-DSCH is intended for that particular UE.

This process is complicated in that the information bits that form the first part of the HS-SCCH do not include a CRC attachment. As such, to aid data recovery a receiver uses convolutional decoder metrics for error detection.

Two common convolutional decoder techniques used for error detection are the Viterbi path metric difference algorithm and the Yamomoto-Itoh YI algorithm.

The Viterbi algorithm is based on a trellis diagram that is used to perform the decoding process in order to identify the particular path through the trellis that maximizes the probability that the corresponding bit sequence was transmitted, conditioned to the received data samples (Maximum Likelihood ML sequence).

In particular, the Viterbi path metric difference algorithm computes the difference in Viterbi path metrics between the merging paths in the last stage of a Viterbi trellis. The calculated difference is compared to a threshold. If the calculated difference is greater that the threshold the decoding is declared a success, otherwise it is declared a failure. When performing this calculation on the first part of the HS-SCCH, a successful decoding implies that the HS-SCCH transmission is estimated to be intended for the UE and a failure implies that the HS-SCCH transmission is estimated not intended for the UE.

An improved technique for decoding the HS-SCCH uses the YI algorithm, where the YI algorithm is based on a modified form of the Viterbi algorithm to produce a reliability indicator. In particular, the YI algorithm is based on the principle that when two paths merge in a Viterbi trellis and are close in terms of their path metrics, then the selection of one of the paths over the other is prone to error. For example, states in a trellis are labelled as "good" or "bad" depending on whether the survivor path at a state is reliable or not. To begin with all states are labelled "good." As Viterbi decoding progresses and a survivor path is selected over a merging path at a state, the path metric difference is computed. This computed path metric difference is compared to a threshold. If the computed difference is less than the threshold the surviving path is labelled "bad," otherwise it is labelled "good." In any subsequent stage in the trellis, if a path labelled "bad" is selected over a merging path it retains the label "bad" even if the path metric difference exceed the threshold at that stage. At the end of the Viterbi decoding, the label on the chosen survivor path is checked. If the survivor path has a "good"

label the decoding is regarded as a success and if "bad" the decoding is declared a failure.

However, both the Viterbi and YI algorithms can be computationally intensive, which can result in increased processor requirements and correspondingly an increase in associated power and cost of a device.

It is desirable to improve this situation.

SUMMARY OF INVENTION

In accordance with an aspect of the present invention there is provided a decoder and a method for decoding according to the accompanying claims.

This provides the advantage of allowing the computational requirements for decoding data to be less than that required for decoding data using the Viterbi or YI algorithms.

BRIEF DESCRIPTION OF THE DRAWINGS

An embodiment of the invention will now be described, by way of example, with reference to the drawings, of which.

DETAILED DESCRIPTION

Figure 1:
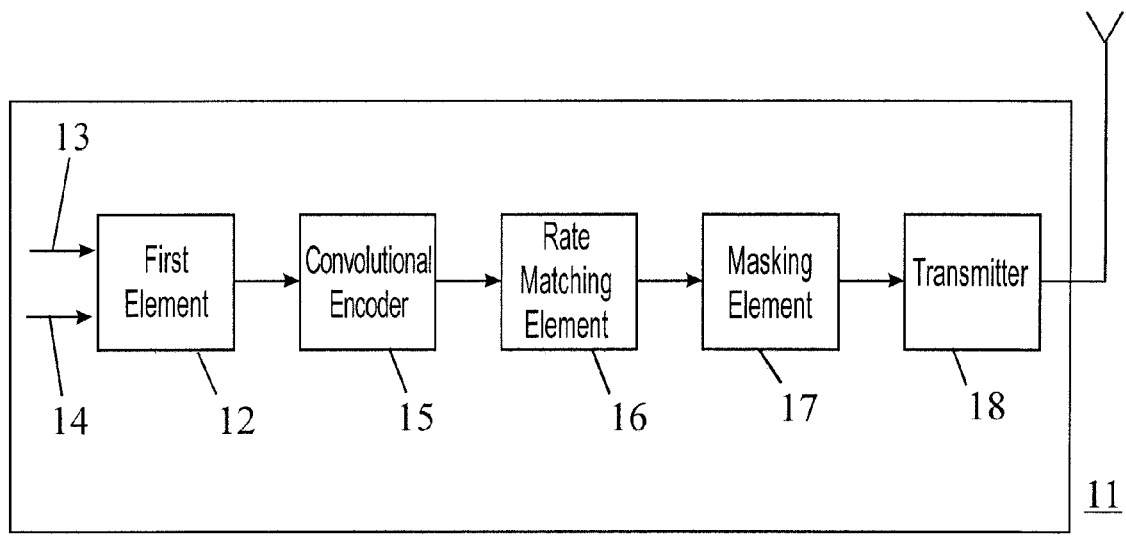
FIG. 1 illustrates a wireless communication system element arranged for generating the first part of a HS-SCCH.
Figure 2:
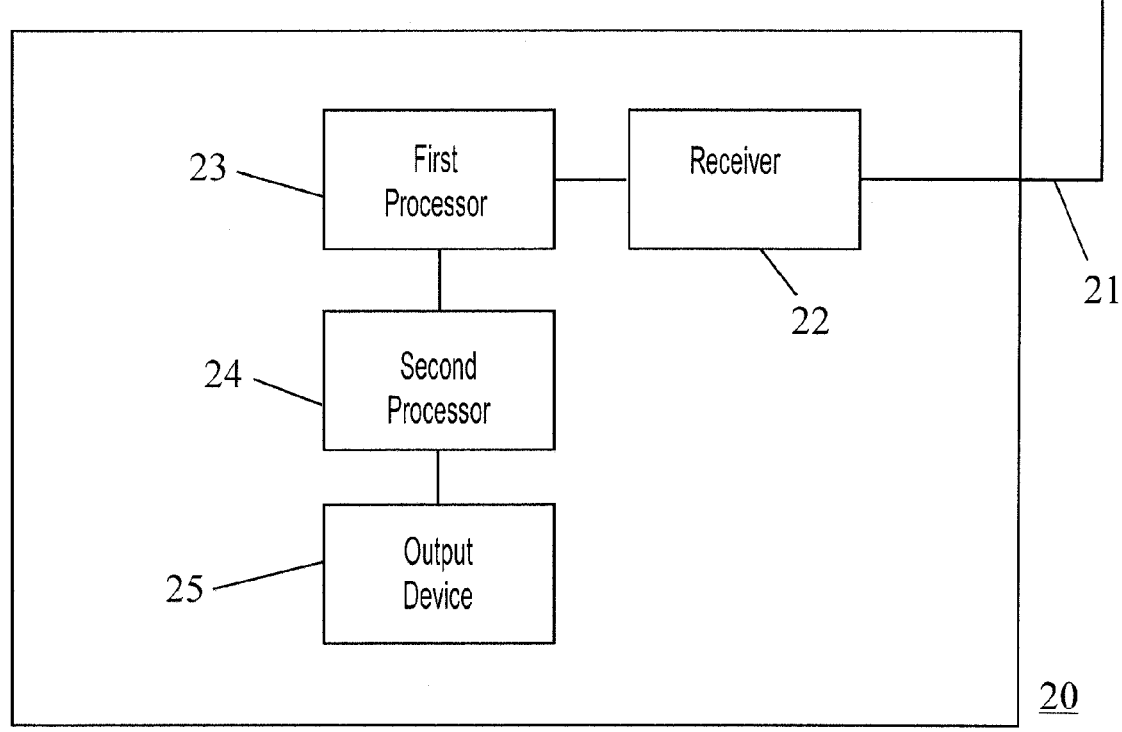
FIG. 2 illustrates a wireless communication device including a decoder according to an embodiment of the present invention.

FIG. 2 shows a user equipment UE in the form of a wireless communication device 20, for example a radiotelephone, a PDA or laptop, arranged to operate in accordance with the 3GPP wireless communication standard. The wireless communication device 20 includes an antenna 21, a receiver 22, a first processor 23, a second processor 24 and an output device 25.

The antenna 21 is coupled to the receiver 22, which are arranged to receive a wideband code division multiple access WCDMA RF wireless communication signal that is in accordance with the 3GPP standard, as is well known to a person skilled in the art.

The received signals that are generated by the receiver 22 are provided to the first processor 23 in the form of a stream of data samples (i.e. a data sequence). The first processor 23 is arranged to despread, descramble, demodulated and decode the stream of data samples to recover the original information generated by the transmitting device, for example a base station, as described below.

Although the first processor 23 and receiver 22 are shown to form separate logical elements they can also be combined to form a single element. Alternatively, a single processor could perform the functions of the first processor 23 and second processor 24.

Upon successful decoding of a HS-SCCH (i.e. the successful decoding of the codeword corresponding to the estimate of the 8 information bits that forms the first part of the HS-SCCH) the decoded information bits are provided to the second processor 24 to allow recovery of data transmitted on the HS-DSCH. The second processor 24 is coupled to an output device 25.

The wireless communication device 20 will typically include other well known features, which are well known to a person skilled in the art and as such will not be describe any further for the purposes of the present embodiment.

Figure 3:
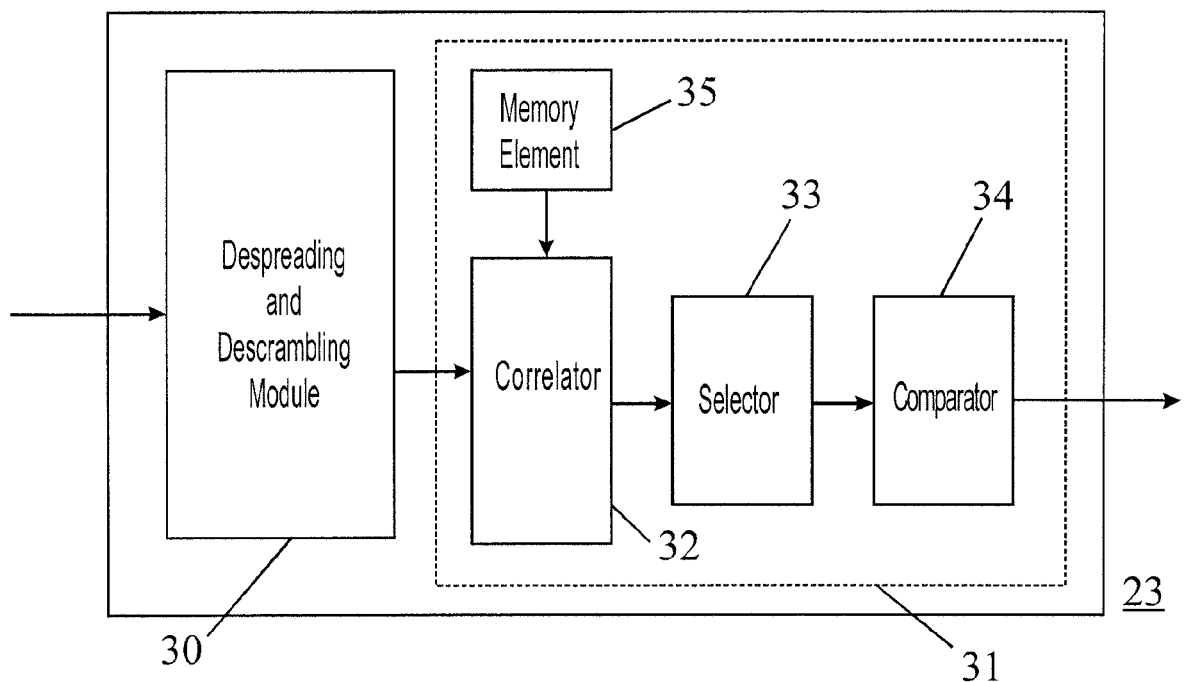
FIG. 3 illustrates a decoder according to an embodiment of the present invention.

As shown in FIG. 3, the first processor 23 includes a despreading and descrambling module 30 coupled to a decoder 31 where the decoder 31 includes a correlator 32, a selector 33, a comparator 34 and an optional memory element 35.

The despreading and descrambling module 30 is arranged to despread and descramble the received stream of data samples to generate the sequence of 40 samples corresponding to the 40-bit codeword generated by the transmitting element in the transmitting device, as described above. The module may include additional processing to improve the receiver performance in the presence of a multipath channel, as is well known to a person skilled in the art.

In contrast to the prior art technique of decoding in which a received data sequence is processed in accordance with the Viterbi or YI algorithm, the present decoder 31, as described in detail below, operates on the basis of comparing a received sequence with all possible 40-bit transmitted codewords. For the purposes of the present embodiment in which only 8 unique information bits are encoded and transmitted in the first part of a HS-SCCH, only $2^8=256$ possible codewords could be applicable/intended for a specific UE.

Accordingly, a data sequence received by the decoder 31 via the despreading and descrambling module 30 is correlated using the correlator 32 with codewords that could be intended for the UE, which as stated above for the purposes of the present embodiment will be 256 codewords. As such, for the present embodiment the correlator 32 includes a bank of 256 parallel correlators (not shown) where each one of the bank of 256 correlators correlates one of the 256 possible codewords with the received data sequence. Although the current embodiment describes the use of a correlator 32 having a bank of 256 parallel correlators, alternative correlators could be used, for example a single correlator in which serial correlations are performed.

Additionally, codewords having more or less than eight information bits could also be decoded where the number of correlations to be performed would vary accordingly. For example, for a codeword corresponding to 6 information bits only $2^6$ (i.e. 64) correlations would need to be performed for each received data sequence.

Coupled to the correlator 32 is a memory 35 for storing the 256 possible codewords where the 256 possible codewords are computed offline and stored in the memory 35 prior to operation of the decoder 31. Alternatively, other means for providing the possible codewords to the correlator 32 are possible, for example a codeword generator (not shown) that is arrange to generate the codewords in a similar fashion to the codeword generator in the transmitting device, as described above.

As each codeword is represented by 40 bits (i.e. 5 bytes) and the memory is arranged to store 256 codewords, the memory 35 will typically be required to store at least 1280 bytes of information. Accordingly, the size of the memory 35 will typically be dependent upon the number of possible codewords that could be intended for a UE.

In the preferred embodiment of the present invention, 256 correlations are performed for each received sequence. Therefore, the total number of operations performed by the correlator 32 is in the order of 10,751 (i.e. 256 ×40 =10,240 operations of sign change and accumulate, plus 511 operations of compare and store). In comparison, more than 28,672 operations would be required to perform decoding using the YI algorithm (the basic Viterbi algorithm for decoding the rate ⅓, constraint length 9 convolutional code requires (2×256×3+256)×16 operations).

The number of operations to be performed by the decoder 31 will vary according to the number of correlations that need to be performed. However, the number of operations to be performed using the YI algorithm will vary in a different proportion with the number of information bits. As such, there will be a threshold, for the number of codeword information bits, that will determine whether decoding via correlation of codewords or by the use of the YI algorithm will result in fewer operations when performing decoding. In the present embodiment, where part 1 of the HS-SCCH has 8 information bits the number of correlations is fixed at 256, and consequently the present embodiment has a computational advantage over the YI algorithm. However, the decoder 31 could be arranged to switch between decoding via correlation of codewords, as described herein, and a Viterbi based algorithm, such as the YI algorithm, based upon the number of received data samples, corresponding to a codeword, that need to be decoded.

The correlator 32 is arranged to generate an output value for each correlation where the output value is indicative of the likelihood that the codeword being correlated with the received sequence is the transmitted codeword.

For the purposes of the present embodiment, the output value generated by each one of the bank of 256 correlators are related to the natural logarithm of the probability of the correlated codeword being the particular codeword that was transmitted by the transmitting device, conditioned to the received data sequence.

In the present embodiment, the selector 33 is arranged to receive each of the correlation output values and select the two largest correlation values (i.e. the two values that correspond to the two most likely transmitted codewords).

The selector 33 is then arranged to subtract the second largest correlator output value from the largest output value to produce a resulting value where the resulting value provides an approximation to the log likelihood ratio for the specific codeword that produced the largest correlation output value when correlated with the received data sequence.

Figure 4:
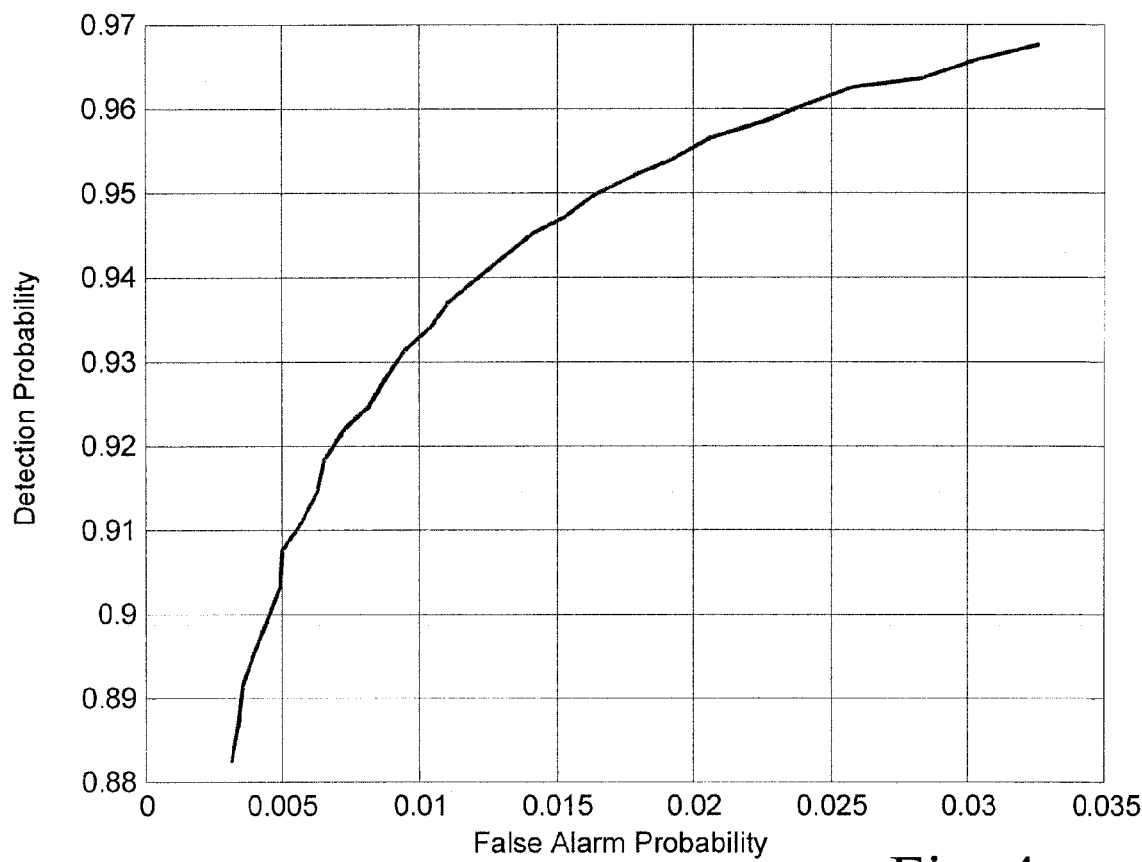
FIG. 4 illustrates the detection probability versus the false alarm probability for a decoder according to an embodiment of the present invention.

The resulting value (i.e. the approximation of the log likelihood ratio) is provided to the comparator 34 for comparison with a threshold value to provide a decoding reliability indicator. The threshold value is selected to provide an indication of the likelihood that the codeword that has been correlated with the received sequence to produce the largest correlation output value (i.e. the most likely transmitted codeword) is the same as the actual transmitted codeword, i.e. that a successful decoding has occurred. As such, the probability of correctly identifying whether a successful decoding has been performed is dependent on the setting of the threshold value. For example, if the threshold value is set too high then only a subset of possible successful decodings will be identified. However, if the threshold value is set too low then unsuccessful decodings may inadvertently be identified as successful decodings. As such, the setting of the threshold value is dependent upon the acceptable error rate for the decoder 31. For example, FIG. 4 provides an illustration of the detection probability (i.e. the y axis) and false alarm probability (i.e. x axis) performance obtained with the present embodiment of the invention. The present embodiment has the same detection probability/false alarm probability performance as that demonstrated using the prior art YI algorithm technique while, as stated above, using considerably fewer operations for decoding a codeword containing information bits less than a given number.

If the comparator 34 makes a determination that the calculated approximation of the log likelihood ratio is greater than the specified threshold value (i.e. a successful decoding has been deemed to have occurred), the 8 information bits that correspond to the codeword having the largest correlator output value are provided to the processor 24 for processing the appropriate data transmitted on the HS-DSCH.

If the comparator 34 makes a determination that the calculated approximation of the log likelihood ratio is less than the specified threshold value (i.e. an unsuccessful decoding has occurred) the wireless communication device 20 continues to monitor the HS-SCCH channels without attempting to receive data over the HS-DSCH.

We note that, in an alternative implementation of the present invention, the detection process may be based on more than two and up to all correlation values produced by the correlator 32.

It will be apparent to those skilled in the art that the disclosed subject matter may be modified in numerous ways and may assume embodiments other than the preferred forms specifically set out as described above, for example the decoding of channels other than HS-DSCH and HS-SCCH could be performed and the decoding could be performed on data transmitted according to wireless communication standards other than 3GPP.

What is claimed:

1. A decoder for use in a wireless communication device, the decoder comprising a correlator for correlating a received data sequence with a set of codewords such that a correlation value is generated for each correlation, wherein the set of codewords correspond to possible codewords that could be generated from encoding bit sequences having a predetermined number of information bits; a selector for selecting a first correlation value and a second correlation value generated by the correlator and for subtracting the second correlation value from the first correlation value to generate a third value; and a comparator for comparing the third value with a predetermined value to generate a decoding reliability indicator.

2. A decoder according to claim 1, wherein the received data sequence corresponds to a transmitted codeword representing a predetermined number of encoded information bits.

3. A decoder according to claim 2, wherein the correlation values are indicative of the likelihood that the respective codeword corresponds to the information bits represented by the transmitted codeword.

4. A decoder according to claim 1, wherein the set of codewords corresponds to all possible codewords that could be generated from encoding bit sequences having the predetermined number of information bits.

5. A decoder according to claim 1, further comprising a memory for storing the set of codewords.

6. A decoder according to claim 1, wherein the first correlation value is the highest determined correlation value for a given set of codewords and the second correlation value is the second highest determined correlation value for the given set of codewords.

7. A decoder according to claim 1, wherein the predetermined number of information bits is below a threshold number.

8. A decoder according to claim 1, further comprising a receiver arranged to receive a data sequence that corresponds to the first slot of a wideband code division multiple access WCDMA shared control channel transmission time interval TTI.

9. A decoder according to claim 8, wherein the WCDMA shared control channel is the high speed shared control channel HS-SCCH, and the first slot contains part 1 of the HS-SCCH.

10. A decoder according to claim 1, wherein the received data sequence corresponds to a transmitted forty bit codeword representing eight encoded information bits.

11. A decoder according to claim 10, wherein the correlator includes 256 parallel correlators to allow correlation of the received data sequence with 256 codewords.

12. A decoder according to claim 11, wherein the memory is arranged to store 256 codewords that correspond to the 256 possible codewords that can represent eight encoded information bits.

13. A decoder according to claim 1, wherein if the third value is greater than the predetermined value the reliability indicator is arranged to indicate that the codeword is intended for an apparatus associated with the decoder.

14. A wireless communication device having a decoder according to claim 1.

15. A radiotelephone having a decoder according to claims 1.

16. A method for determining a decoding reliability indicator, the method comprising correlating a received data sequence with a set of codewords, where the set of codewords corresponds to possible codewords that could be generated by encoding a predetermined number of information bits, to generate a correlation value for each correlation; selecting a first generated correlation value and a second generated correlation value and subtracting the second generated correlation value from the first generated correlation value to generate a third value; and comparing the third value with a predetermined value to generate a decoding reliability indicator.

* * * * *